US011431002B2

(12) United States Patent
Yang et al.

(10) Patent No.: US 11,431,002 B2
(45) Date of Patent: Aug. 30, 2022

(54) FUEL CELL MICROSEAL AND A METHOD OF MANUFACTURE THEREOF

(71) Applicant: GM Global Technology Operations LLC, Detroit, MI (US)

(72) Inventors: Xi Yang, Bloomfield Hills, MI (US); Anita Luong, Ann Arbor, MI (US); Liang Xi, Northville, MI (US); Siguang Xu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 593 days.

(21) Appl. No.: 16/392,081

(22) Filed: Apr. 23, 2019

(65) Prior Publication Data

US 2019/0252693 A1   Aug. 15, 2019

Related U.S. Application Data

(62) Division of application No. 15/412,085, filed on Jan. 23, 2017, now abandoned.

(51) Int. Cl.
| | |
|---|---|
| *H01M 8/0276* | (2016.01) |
| *H01M 8/0286* | (2016.01) |
| *H01M 8/0284* | (2016.01) |
| *H01M 50/183* | (2021.01) |
| *H01M 8/10* | (2016.01) |

(52) U.S. Cl.
CPC ....... *H01M 8/0276* (2013.01); *H01M 8/0284* (2013.01); *H01M 8/0286* (2013.01); *H01M 50/183* (2021.01); *H01M 2008/1095* (2013.01); *Y02P 70/50* (2015.11)

(58) Field of Classification Search
CPC ............ H01M 8/0286; H01M 8/0276; H01M 8/0284; H01M 50/183; H01M 2008/1095; F16J 15/08; F16J 15/0806; F16J 15/0818; F16J 2015/0856; Y02P 70/50
See application file for complete search history.

(56) References Cited

U.S. PATENT DOCUMENTS

| | | | |
|---|---|---|---|
| 3,477,867 A * | 11/1969 | Hillier | ................ B29D 99/0053 427/272 |
| 6,153,326 A | 11/2000 | Matsukawa et al. | |
| 6,761,991 B2 | 7/2004 | Frisch et al. | |
| 7,595,126 B2 | 9/2009 | Wells et al. | |
| 7,608,355 B2 | 10/2009 | Hayashi et al. | |
| 8,371,587 B2 | 2/2013 | Fly et al. | |
| 2004/0256129 A1 * | 12/2004 | Matsumoto | ............ F02F 11/002 174/370 |
| 2011/0203721 A1 | 8/2011 | Enayetullah et al. | |
| 2014/0238845 A1 | 8/2014 | Domit et al. | |

* cited by examiner

*Primary Examiner* — Gilbert Y Lee

(74) *Attorney, Agent, or Firm* — Quinn IP Law

(57) ABSTRACT

A microseal for a metal bead seal joint includes a substantially horizontal surface, first and second substantially vertical surfaces disposed on opposite ends of the substantially horizontal surface, and a contoured surface operatively configured to adhere to a portion of a metal bead. The contoured surface may be disposed opposite the substantially horizontal surface and may be integral to the first and second substantially vertical surfaces. The substantially horizontal surface may be operatively configured to substantially maintain its horizontal surface orientation in both a compression state and a non-compression state.

20 Claims, 8 Drawing Sheets

FUEL CELL MICROSEAL AND A METHOD OF MANUFACTURE THEREOF

CROSS REFERENCE TO RELATED APPLICATIONS

This application is a divisional of U.S. application Ser. No. 15/412,085, filed on Jan. 23, 2017, and claims priority to and the benefit of the same, the disclosure of which is hereby incorporated by reference in its entirety.

TECHNICAL FIELD

The present disclosure relates to fuel cell microseals, and in particular, a fuel cell microseal to prevent buckling in the metal bead integrally formed into a fuel cell plate.

INTRODUCTION

Fuel cells are used as an electrical power source in many applications. In particular, fuel cells are proposed for use in automobiles to replace internal combustion engines. A commonly used fuel cell design uses a solid polymer electrolyte (SPE) membrane or proton exchange membrane (PEM), to provide ion transport between the anode and cathode.

Fuel cells in general are electrochemical devices that convert the chemical energy of a fuel (hydrogen, methanol, etc.) and an oxidant (air or pure oxygen) in the presence of a catalyst into electricity, heat, and water. Fuel cells produce clean energy throughout the electrochemical conversion of the fuel. Therefore, they are environmentally friendly because of the zero or very low emissions. Moreover, fuel cells are high power systems, generating anywhere from a few watts to hundreds of kilowatts with efficiencies much higher than conventional internal combustion engines. Fuel cells also produce low noise because they have few moving parts.

In proton exchange membrane fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly (MEA) in which a solid polymer membrane has an anode catalyst on one face and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates flow field plates). The plates function as current collectors for the anode and the cathode and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive, and gas impermeable. In typical applications, individual fuel cells are stacked in series in order to provide the required level of electrical power.

Embodiments of the conventional electrochemical cell also include hardware components, e.g., plates, for reactant flow separation, current collection, compression and cooling (or heating). A bipolar plate provides multiple functions: (a) distributes reactant flow at the anode or cathode, (b) collects electrical current from operating anode/cathode surfaces, and (c) prevents mixing or cross-over of the anode and cathode reactants in single cells. An assembly of two or more of these single cells is called a stack. A cooling plate (often integral with the bipolar plate) primarily distributes coolant flow in a stack. The number and sizing of single cells in a fuel cell stack is generally selected based on the system power requirements. For convenient assembly and/or disassembly of a fuel cell stack with large voltage or power output, multiple sub-stacks or modules, can be combined to form the stack. The modules represent stacks of single cells in some number less than what ultimately results in the completed stack, as is well understood by those of ordinary skill in the art. When the stack forms a PEM fuel cell, the stack is often referred to as a PEM stack.

In a conventional PEM stack assembly, sealing of hardware components and active cells, for effective separation of anode and cathode reactant-flows and prevention of their leakage and intermixing, is a critical technical issue with direct impact on stack performance and reliability. These factors, in addition to sealing system design and design for manufacturability have a direct impact on the overall PEM fuel cell system cost.

Leakage or cross-mixing of reactants and coolant between different cells and multiple elements of a single cell is conventionally prevented by compressive or adhesive seals, which in some instances make use of elastomeric and/or adhesive materials. For example, in U.S. Pat. No. 6,080,503, membrane electrode assembly (MEA) surfaces around the electro-active area are adhesively bonded together with support plates. The adhesive bond is formed of an adhesive agent that encapsulates the edge portion of the MEA. In another example, in U.S. Pat. No. 5,176,966, seals are formed by impregnating the backing layer (gas diffusion layer or GDL) of the electrodes with a sealant material (silicon rubber) which circumscribes the fluid-flow openings and the electro-active portion of the MEAs. Alternatively, the sealant material is deposited into the groves formed on the outer surface of the MEA electrodes; the grooves circumscribing the fluid-flow openings and the electro-active portions of the MEAs.

Whether compressive or adhesive, the relevant materials are generally placed upon, fitted, formed or applied to the surfaces being sealed. These processes are labor intensive, costly, and not conducive to high volume manufacturing. The variability of these processes may also compromise reliability/durability of the seals, resulting in poor manufacturing yields. Additionally, for high temperature stack assemblies, these sealing processes and/or materials would have compatibility and/or durability issues due to highly concentrated acidic environments and/or high operating temperatures (e.g., 120° C. to 250° C.).

An adhesive sealant based PEM stack assembly process has been described in a World Publication WO 02/43173 based on U.S. patent application Ser. No. 09/908,359, which involves three steps of sealant application to produce a resin-bonded (encapsulated) PEM stack. These three steps are: (1) sealing the unused manifold openings/ports on each of the fluid flow plates with flow-field structure (for example, on the cathode flow-field surface, ports for fuel and coolant flow are sealed about their perimeter to prevent the mixing of these input streams); (2) sealing all ports within the MEAs to prevent the leakage of reactants within the MEA layers; and (3) sealing a remainder of the desired seal surfaces in the stack assembly. The sealing of the remainder of seal surfaces involves layering of all the pre-sealed components within a mold or fixture, introduction of a curable resin (sealant) around the periphery, and forcing the resin into the stacked assembly (cassette) using vacuum transfer molding or injection molding technique. Once cured, the resin provides the structural support and edge sealing over the entire assembly. The resulting fuel cell cassette/stack is held between the compression plates with manifolding and means of compression.

Further advancement of the three-step PEM stack/cassette assembly process is described in the U.S. Pat. No. 7,306,864, which can be conveniently utilized for high volume stack manufacturing using single-step injection molding. In this approach, all the stack components including support plates, plates for stack cooling, compression and current collection, and MEAs, are appropriately layered up and placed in a mold. The sealant material (2-part silicon or other adhesive resin) is forced into the intricate openings (using pressure or vacuum), while the stacked assembly is held under an optimal pressure for minimal resistance between each electrical contact surfaces. When the viscous sealant material fills all the desired sealing spaces (including MEA edges) including the space surrounding the stack assembly, the mold is placed in a low temperature oven to cure the resin. The encapsulated stack is then taken out from the mold.

With reference to FIG. 1A, microseal material 124 is transferred to a metal bead 120 through a screen 122. The final shape of the traditional microseal 114 is controlled by bead shape (gravity), stencil design, ink viscosity, and surface energy. Unfortunately, as shown in FIG. 1B, when the metal bead buckles, seal contact is not guaranteed, especially in the center region where the metal bead 116 buckles. Failure to maintain seal contact reduces robustness against misalignment of center axes 117 as shown in FIG. 1C. Given a set of metal properties and metal bead geometry including metal thickness specifications, it may not be possible to improve the buckling load of the metal bead sufficiently, by altering the metal form alone.

Accordingly, there is a need for a new fuel cell microseal design which may improve seal contact width and increase robustness against misalignment which further reduces the risk of developing leaks in the fuel cell.

SUMMARY

The present disclosure provides for a microseal for a metal bead seal joint in accordance with various embodiments. A first embodiment of the microseal may include a substantially horizontal surface, first and second substantially vertical surfaces disposed on opposite ends of the substantially horizontal surface and a contoured surface. The contoured surface may be disposed opposite the substantially horizontal surface and may be integral to the first and second substantially vertical surfaces. The substantially, horizontal surface may be operatively configured to substantially maintain its substantially horizontal surface orientation in both a compressed state and an uncompressed state.

A metal bead seal joint for a fuel cell plate, the metal bead seal joint includes a first metal bead having a first microseal and a second metal bead having a second microseal. The second metal bead having a second microseal may be compressed against at least a portion of the first microseal and the first metal bead. Each of the first and second microseals include a contoured surface adhered to each associated metal bead and a substantially horizontal surface disposed opposite to the contoured surface. The contoured surface and the substantially horizontal surface for each microseal (or first and second microseals) define a microseal thickness which may vary along the width of the microseal.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
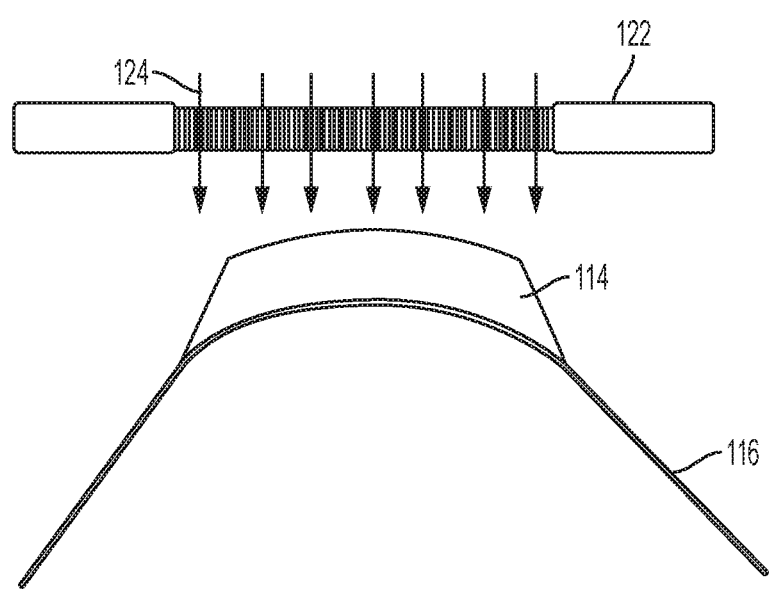
FIG. 1A is a schematic cross-sectional view of a traditional microseal for a metal bead seal where the seal is applied to the bead via a stenciling process.
Figure 1B:
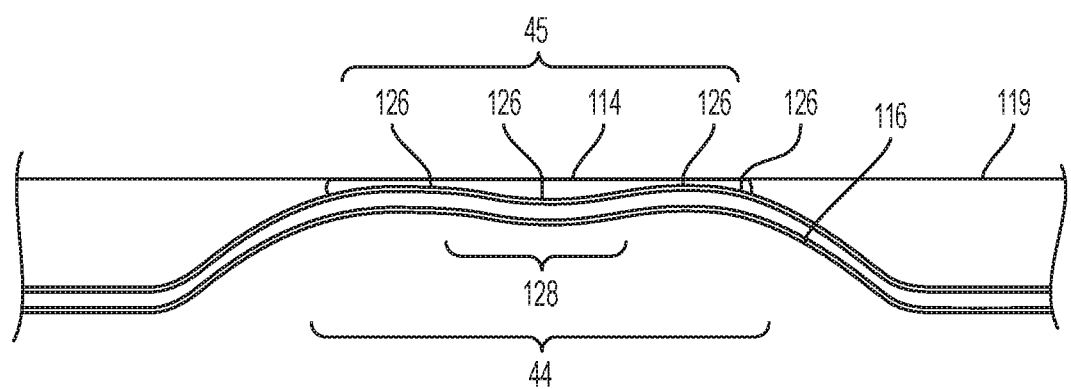
FIG. 1B is a schematic cross-sectional view of the traditional microseal of FIG. 1A when the bead and the seal are in compression.
Figure 1C:
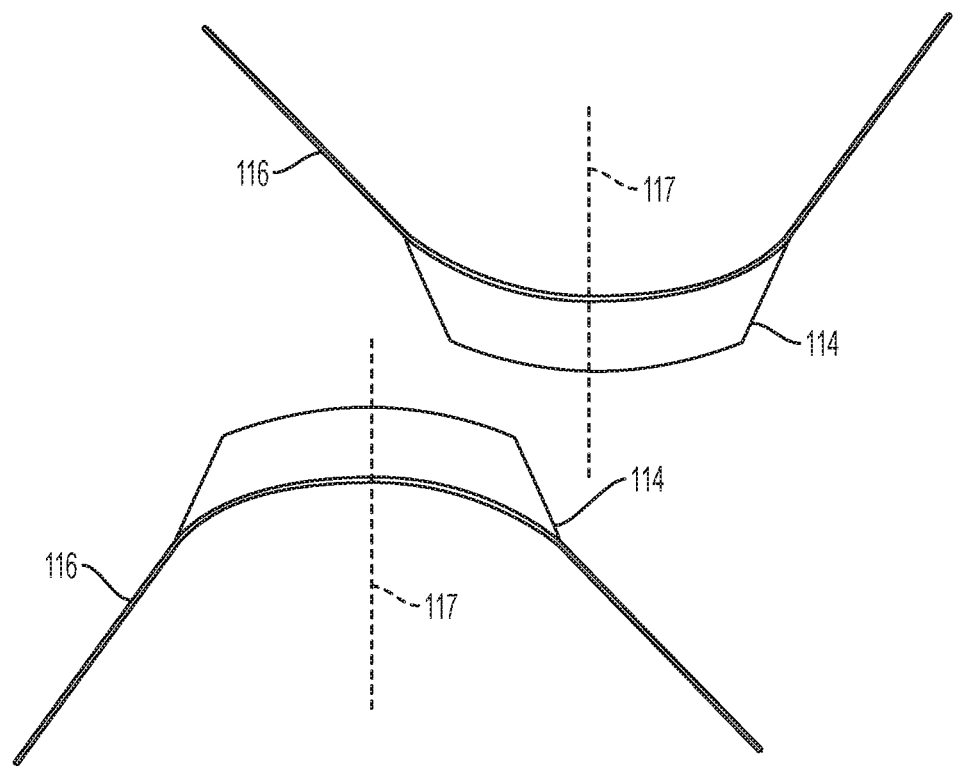
FIG. 1C is a schematic cross-sectional view of the traditional metal bead seal joint having the traditional microseals when the beads and the seals are misaligned, while not in compression.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2A:
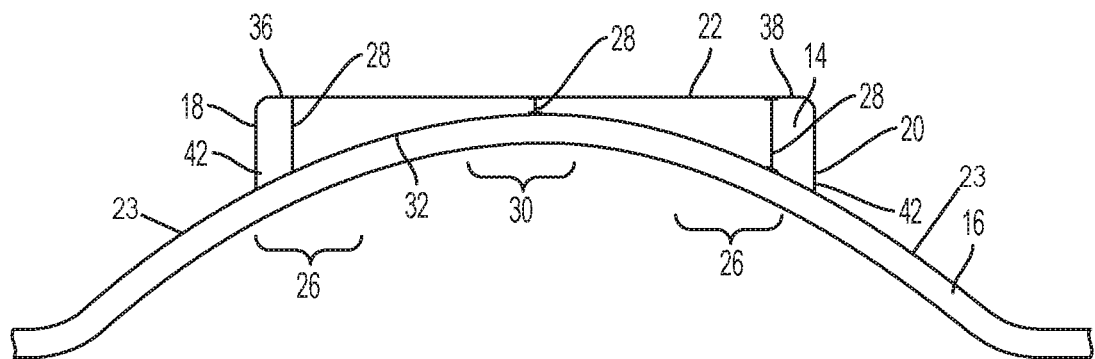
FIG. 2A is a schematic cross-sectional view of a first embodiment of a microseal in accordance to the present disclosure, where the metal bead and the microseal are not in compression.
Figure 4A:
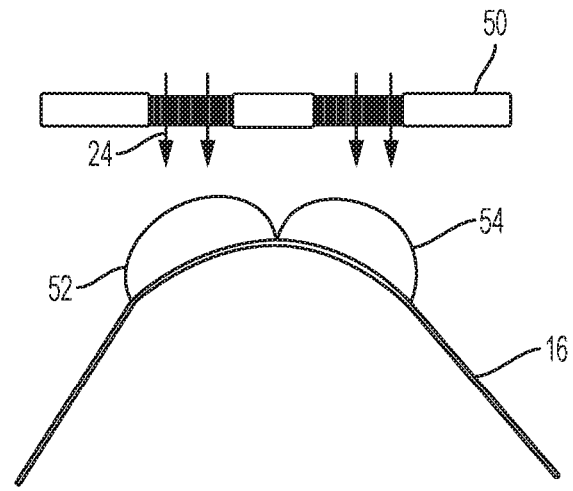
FIG. 4A is a schematic cross-sectional view of a microseal in accordance to with a second embodiment manufacturing method of the present disclosure where the microseal material is applied to the metal bead in a first and a second application.
Figure 4B:
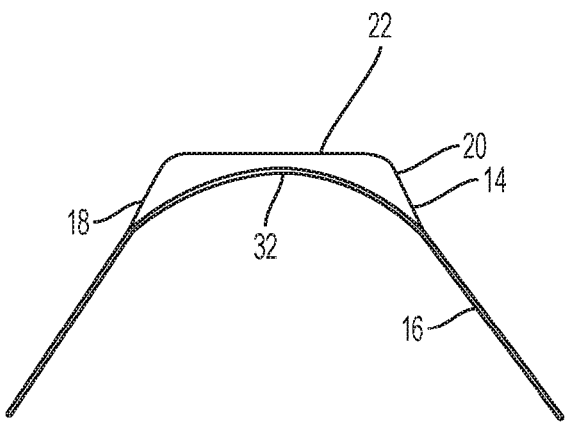
FIG. 4B is a schematic cross-sectional view of a microseal in accordance with the second embodiment manufacturing method of the present disclosure where a substantially horizontal surface is formed in the microseal material.
Figure 5:
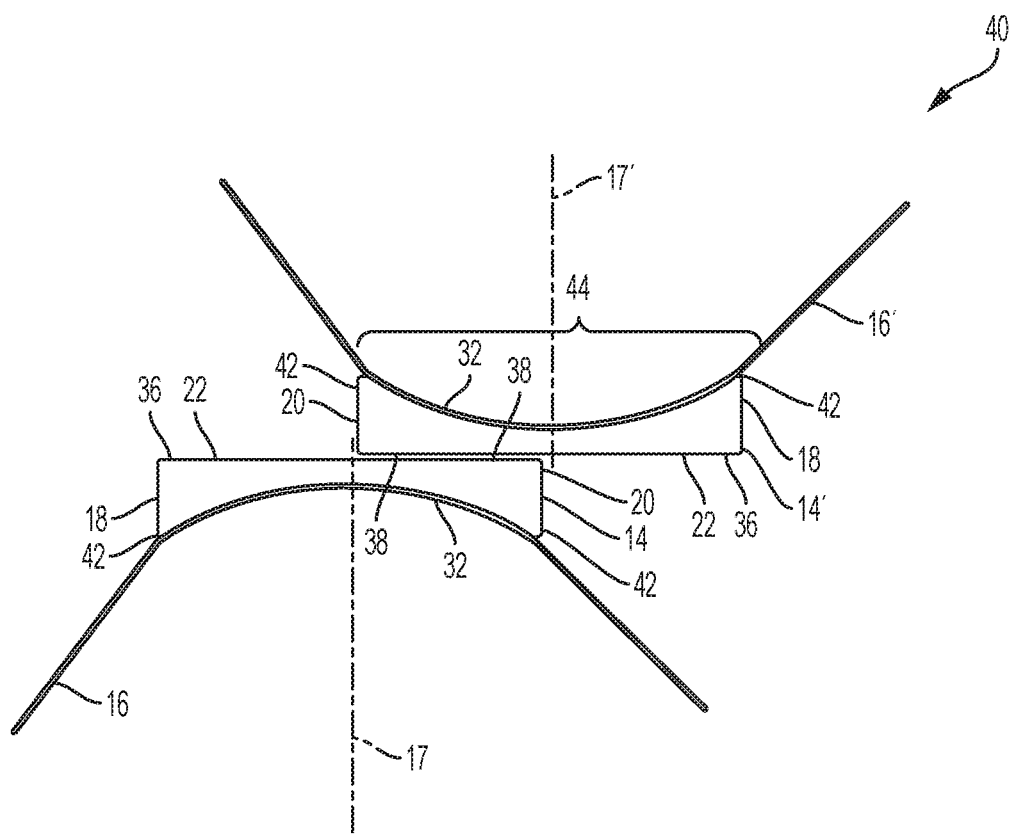
FIG. 5 is a schematic cross-sectional view of the traditional metal bead seal joint having the microseals in accordance with the various embodiments of the present disclosure where the beads and the seals are not in compression and misaligned.

With reference to FIGS. 2A, 4B and 5, the present disclosure provides for an improved microseal design 14 which better maintains the joint between metal beads in a fuel cell plate. As shown, the microseal 14 includes a substantially horizontal surface 22, first and substantially vertical surfaces and a contoured surface 32. The first substantially vertical surface 18 may be disposed a first end 36 of the substantially horizontal surface 22. The second substantially vertical surface 20 may be disposed at a second end 38 of the substantially horizontal surface 22. The contoured surface 32 may be disposed opposite the substantially horizontal surface 22 as shown in the aforementioned figures. The contoured surface 32 is integral to the first and second substantially vertical surfaces 18, 20 and is disposed between the first and second substantially vertical surfaces 18, 20 as shown in the cross-sectional images. The contoured surface 32 is operatively configured to adhere to a portion of a metal bead 16 as the metal bead 16 is compressed as shown in FIG. 2B under load 19.

With reference to FIG. 2A, a microseal 14 according to various embodiments of the present disclosure is shown in an uncompressed state. The microseal material may be formed from any number of elastomer materials, including, but not limited to EPDM, HNBR, NBR, VMQ, FVMQ, and FKM, therefore, the microseal 14 in general compresses when a load is applied, FIG. 2B illustrates the microseal 14 under a compression load or in a compressed state. As shown in both FIGS. 2A and 2B, the substantially horizontal surface 22 is operatively configured to maintain a substantially flat surface orientation when subjected to a vertical load in both the compressed state and the uncompressed state. The entire surface area of the contoured surface 32 of the microseal 14 is operatively configured to flex together with the improved microseal 14 when a load 19 is applied as illustrated in FIGS. 2A and 2B.

The contoured surface 32 and the substantially horizontal surface 22 for all microseals 14 of the present disclosure define a microseal thickness 28, 28'. Microseal thickness 28 is the thickness in the uncompressed state while microseal thickness 28' is the thickness in the compressed state. As shown in FIG. 2A, the microseal thickness 28 is greater at an edge region 26 than the microseal thickness 28 at a center region 30 in the uncompressed state. The edge region 26 may be defined as the region of the microseal 14 which is proximate to each of the first and the second substantially vertical surfaces and the center region 30 may be disposed between the edge region 26 for the first substantially vertical surface 18 and the edge region 26 for the second substantially vertical surface 20. As shown in FIG. 2A and FIG. 5, the microseal thickness 28 varies along a width of the substantially horizontal surface 22 when the microseal is initially disposed on the metal bead 16. The microseal thickness 28 is greater at or proximate to each of the first and second substantially vertical walls (edge region 26) than the microseal thickness 28 in the center region 30 of the microseal. However, as shown in FIG. 2A, in the first embodiment design where the microseal 14 is a molded part which may be affixed to a metal bead 16.

Figure 2B:
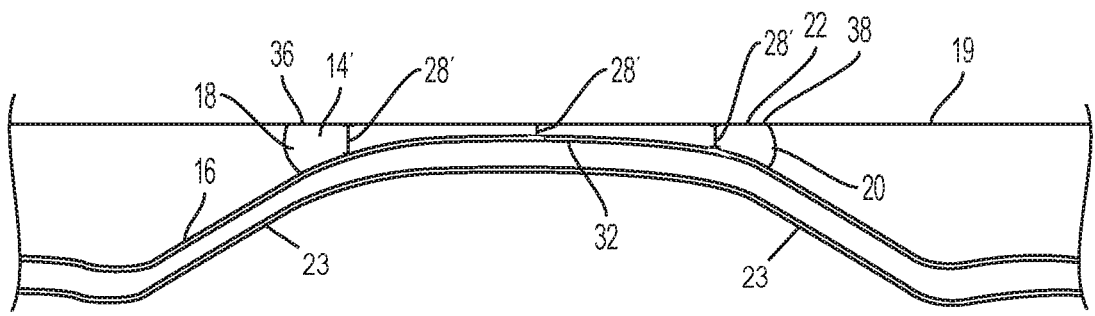
FIG. 2B is a schematic cross-sectional view of the first embodiment of a microseal in FIG. 2A, where the metal bead and the microseal are compressed.

Referring now to FIG. 5, a metal bead seal joint 40 for a fuel cell plate is shown wherein microseals 14 of FIGS. 2A and 2B are implemented. As shown, a first metal bead 16 has a first microseal 14 which is adhered to at least a portion of the first metal bead 16. A second metal bead 16' having a second microseal 14 is also shown wherein the second microseal 14' which is adhered to at least a portion of the second metal bead 16'. The second metal bead 16' and the second microseal 14' may be compressed against at least a portion of the first microseal 14 and the first metal bead 16.

The microseals 14, 14' used in the metal bead seal joint 40 of FIG. 5 similarly each include a substantially horizontal surface 22, first and second substantially, vertical surfaces 18, 20 and a contoured surface 32. The first substantially vertical surface 18 may be disposed at a first end 36 of the substantially horizontal surface 22 and the second substantially vertical surface 20 may be disposed at a second end 38 of the substantially horizontal surface 22. As shown, the contoured surface 32 may be disposed opposite the substantially horizontal surface 22 at the opposite ends 42 of the first and second substantially vertical surfaces 18, 20. The contoured surface 32 may be integral to the first and second substantially vertical surfaces 18, 20.

With reference to FIG. 5, the microseal 14 of FIG. 2A is shown in a metal bead seal joint 40 each of the first substantially horizontal surfaces 22 are operatively configured to maintain a substantially flat orientation in a compressed state (shown in FIG. 2B and FIG. 5) as well as a non-compressed state (shown in FIG. 2A). Accordingly, the metal bead seal joint 40 maintains contact between each metal bead 16, 16' during compression even if the center axes 17, 17' of metal beads 16, 16' are not perfectly aligned as shown in FIG. 5. As shown, each of the first and second substantially vertical surfaces 18, 20 and the contoured surface 32 are operatively configured to have a surface orientation which may or may not change between the compression and non-compression states while the substantially horizontal surface 22 maintains its orientation. It is understood that the orientation of the first and second substantially vertical surfaces 18, 20 and the contoured surface 32 may change given that each contoured surface 32 (for the first and second microseals 14, 14') is operatively configured to adhere to and flex with at least a portion 44 of one of the first and second metal beads 16, 16'. Therefore, each contoured surface 32 is operatively configured to flex as the first and second metal beads 16, 16' flex under compression. The vertical surfaces 18, 20 may flex as the contoured surfaces 32 flexes with the metal bead 16, 16' as shown in FIG. 2B.

Accordingly, the new microseal shape (formed from the first and second vertical surfaces 18, 20, the contoured surface 32 and the horizontal surface 22) more effectively distributes and transfers the vertical compressive load to the side-walls 23 in the metal bead 16. The redistribution of the load 19 keeps the "substantially horizontal surface 22" of the microseal 14 "substantially horizontal" during compression. This improved load transfer and distribution then also increases the buckling load of the sealing joint 40.

Referring again to FIG. 5, each of the contoured surface 32 and the substantially horizontal surface 22 for each of the first and second microseals 14, 14' define a microseal thickness 28. Furthermore, the microseal thickness 28 may vary along a width of the microseal 14, 14' prior to compression wherein the thickness 28 increases toward first and second edges of the seal ("edge regions 26"), and the thickness 28 in the center region 30 of the microseal 14 is relatively lower to the edge regions 26. In compression, microseal thickness 28' may still vary along the width 45. However, the thickness 28' under compression may be less varied due to the compression (or vertical load).

Figure 6:
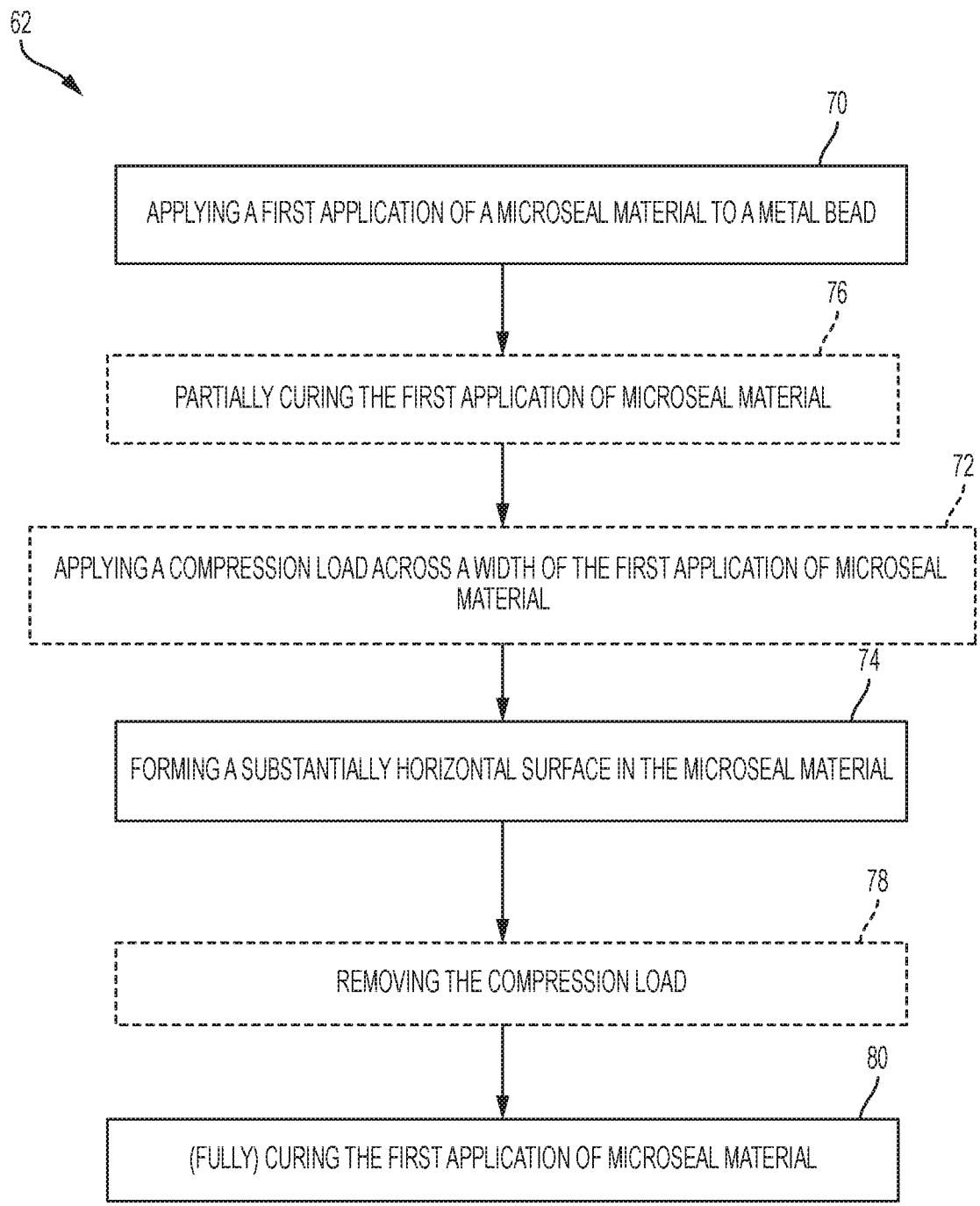
FIG. 6 is an example process flow chart which illustrates an example, non-limiting method of manufacturing the first embodiment microseal of the present disclosure.

With reference now to FIG. 6, a first embodiment method 62 to manufacture a microseal 14 is shown. The first embodiment method 62 includes the steps of: (1) applying a first application of a microseal material to a metal bead wherein the microseal material is in a viscous state 70; (2) forming a substantially horizontal surface in the microseal material 74; and (3) curing the microseal material 78. These steps are shown in solid in FIG. 6 while the other steps are shown in phantom to indicate additional steps which may be implemented.

The additional steps for the first embodiment method 62 may include. (1) partially curing the first application of the microseal material 76; (2) applying a compression load across a width of the partially cured microseal material 72—thereby forming a substantially horizontal surface as described above—while continuing to cure the microseal material; (3) removing the compression load 78; and (4) fully curing the first application of the microseal material thereby forming a microseal 80.

Figure 3A:
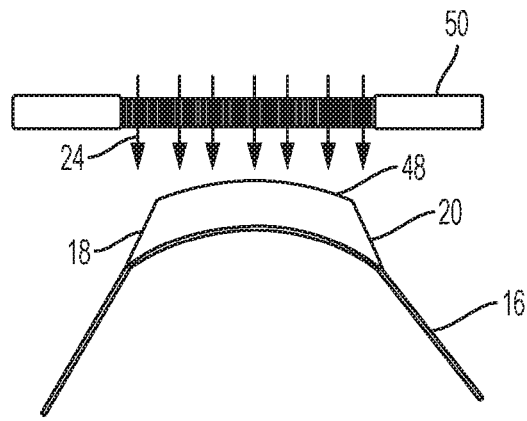
FIG. 3A is a schematic cross-sectional view of a microseal in accordance with a first embodiment manufacturing method of the present disclosure where the microseal material is applied to the metal bead.
Figure 3B:
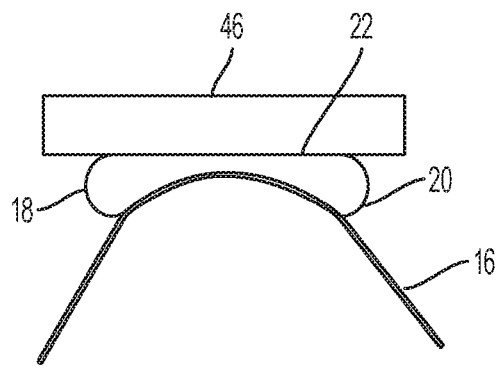
FIG. 3B is a schematic cross-sectional view of a microseal in accordance with a first embodiment manufacturing method of the present disclosure, where a load is evenly applied to the microseal material to form a substantially horizontal surface.

With reference to FIGS. 3A and 3B, the microseal 14 is shown according to the first embodiment method of manufacture. As shown in FIG. 3A, the microseal material 24 produced under the first embodiment method of manufacture (shown in FIG. 6) is initially applied to the metal bead in a liquid or viscous state optionally via a screen mesh stencil 50. Upon initial application and due to its viscous nature, the top surface 48 is not initially substantially horizontal (or straight) as shown in FIG. 2A. The microseal material 24 is allowed to partially cure so that the microseal material 24 is in a gel-like state. Once the gel-like state is achieved, a compression load (or plate) 46 may be applied evenly across the top surface 48 of the microseal material 24 thereby forming a substantially horizontal surface 22 as shown in FIG. 3B. As described, the load 46 shown in FIG. 3B may be maintained while the microseal material 24 continues to cure or until the microseal material 24 is fully cured as shown in FIG. 6. In the microseal 14 of FIG. 3B, the substantially vertical surfaces 18, 20 have a significant curve in each surface as shown.

Figure 7:
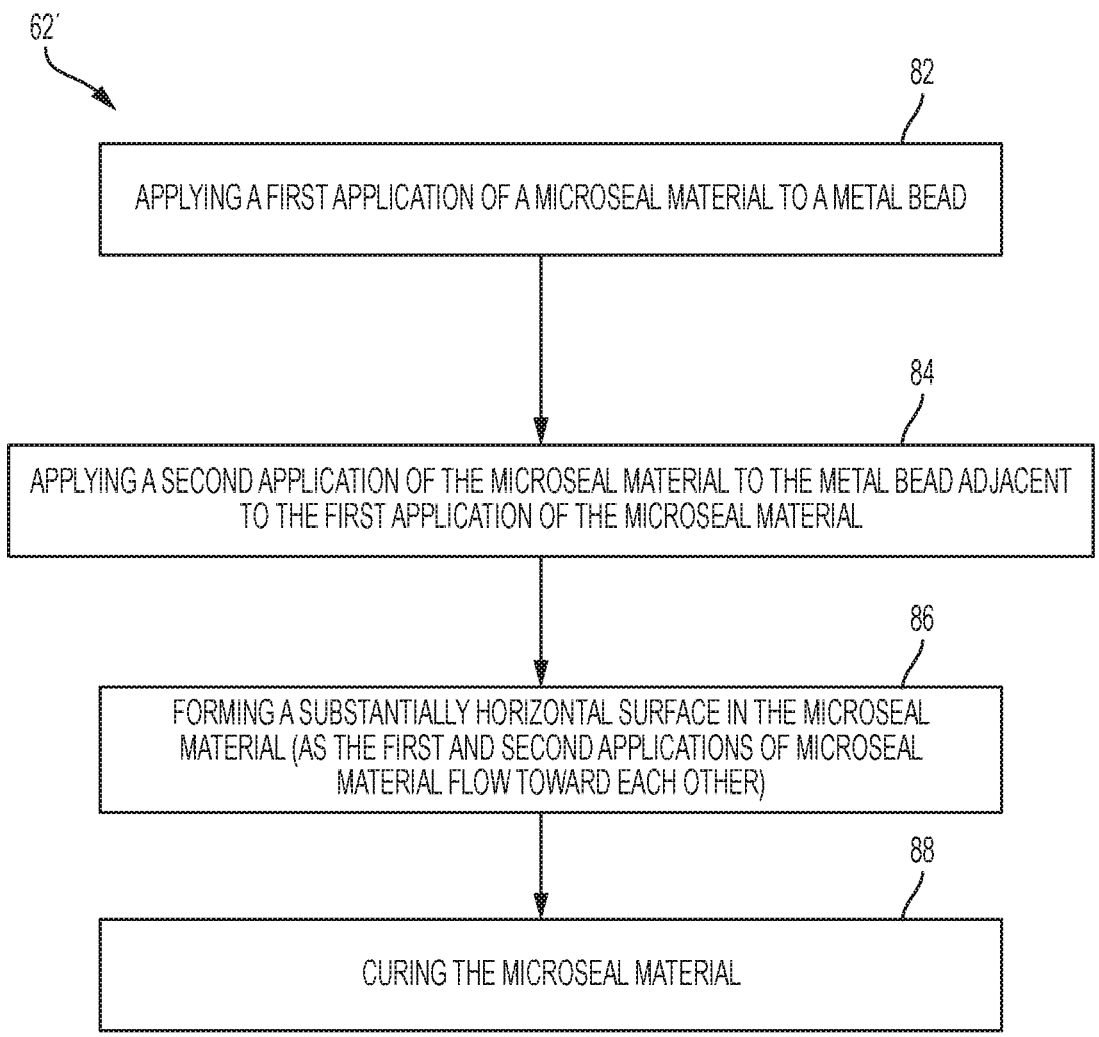
FIG. 7 is an example process flow chart which illustrates an example, non-limiting method of manufacturing the second embodiment microseal of the present disclosure.

With reference to FIG. 7, a second embodiment method 62' to manufacture a fuel cell microseal includes the steps of: (1) applying a first application of a microseal material to a metal bead wherein the microseal material is in a viscous state 82; (2) applying a second application of the microseal material to the metal bead adjacent to the first application of the microseal material wherein the microseal material from the first and second applications are in a viscous state 84; (3) forming a substantially horizontal surface in the microseal material 86; and (4) curing the microseal material 88. It is understood that in the step of forming a substantially horizontal surface in step 86, the first and second applications of microseal material (elements 52 and 54 in FIG. 4A) are operatively configured to flow toward one another thereby forming the substantially horizontal surface 22 (shown in FIG. 4B).

With reference to FIG. 4A, the first and second applications 52, 54 of viscous microseal material 24 are illustrated where the first application 52 and the second application 54 are adjacent to each other. In FIG. 4A, a screen 50 is used to feed the microseal material 24 onto the metal bead 16. FIG. 4B illustrates the end resulting microseal 14 once the first and second applications 52, 54 of viscous microseal material flow toward each other thereby forming a substantially horizontal surface 22. It is to be understood that the end resulting microseals 14 in FIGS. 2A, 3B, and 4A have the same or similar configurations wherein the microseal thickness 28 varies along a width 56 of the substantially horizontal surface 22 when the microseal 14 is disposed on the metal bead 16 in a non-compressed state (shown in FIGS. 2A and 4B). The microseal thickness 28 is greater at or proximate to each of the first and second substantially vertical walls (edge region 26) than the microseal thickness 28 in the center region 30 of the microseal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a microseal, the method comprising:
    applying a first application of a microseal material to a metal bead, wherein the microseal material is in a viscous state while being applied;
    applying a second application of the microseal material to the metal bead adjacent to the first application of the microseal material and simultaneous to the first application of the microseal material;
    forming a substantially flat surface in a side of the microseal material opposite the metal bead by changing a thickness of the microseal material at a center region of the metal bead; and
    curing the microseal material thereby forming the microseal.

2. The method as defined in claim 1, further comprising:
    partially curing the first application of the microseal material prior to forming the substantially flat surface.

3. The method as defined in claim 2, further comprising:
    applying a compression load across a width of the microseal material while continuing the curing of the microseal material to form the substantially flat surface by reducing the thickness of the microseal material at the center region.

4. The method as defined in claim 3, further comprising:
    removing the compression load after the thickness has been reduced.

5. The method as defined in claim 4, wherein the curing comprises fully curing the first application of the microseal material after the compression load has been removed.

6. The method as defined in claim 1, wherein the first application of the microseal material is applied through a screen mesh stencil.

7. The method as defined in claim 1, wherein the first application of the microseal material and the second application of the microseal material once applied to the metal bead are operatively configured to flow toward one another thereby forming the substantially flat surface.

8. The method as defined in claim 7, wherein the thickness of the microseal material at the center region increases while the first application of the microseal material and the second application of the microseal material flow toward one another.

9. The method as defined in claim 1, wherein the first application of the microseal material and the second application of the microseal material are applied to the metal bead through separate openings in a screen mesh stencil.

10. A method for manufacturing a microseal, the method comprising:
    applying a first application of a microseal material and a second application of the microseal material simultaneously to a metal bead, wherein the microseal material is in a viscous state while being applied;
    forming a substantially flat surface in a side of the microseal material opposite the metal bead by changing a thickness of the microseal material at a center region of the metal bead; and
    curing the microseal material thereby forming the microseal.

11. The method as defined in claim 10, wherein the first application of the microseal material and the second application of the microseal material once applied to the metal bead are operatively configured to flow toward one another thereby forming the substantially flat surface.

12. The method as defined in claim 11, wherein the thickness of the microseal material at the center region increases while the first application of the microseal material and the second application of the microseal material flow toward one another.

13. The method as defined in claim 11, further comprising:
    partially curing the first application of the microseal material and the second application of the microseal material after forming the substantially flat surface.

14. The method as defined in claim 13, further comprising:
    applying a compression load across a width of the microseal material while continuing the curing of the microseal material to reduce the thickness of the microseal material at the center region.

15. The method as defined in claim 14, further comprising:
    removing the compression load after the thickness has been reduced.

16. The method as defined in claim 15, wherein the curing comprises fully curing the first application of the microseal material after the compression load has been removed.

17. The method as defined in claim 10, wherein the first application of the microseal material and the second application of the microseal material are applied simultaneously to the metal bead through separate openings in a screen mesh stencil.

18. The method as defined in claim 10, wherein the microseal material is an elastomer material.

19. A method for manufacturing a microseal, the method comprising:
    applying a first application of a microseal material and a second application of the microseal material on a particular surface of a metal bead, wherein the microseal material is in a viscous state while being applied;
    forming a substantially flat surface in a side of the microseal material opposite the metal bead by changing a thickness of the microseal material at a center region of the metal bead; and
    curing the microseal material thereby forming the microseal.

20. The method as defined in claim 19, wherein the first application of the microseal material on the metal bead is adjacent to the second application of the microseal material on the metal bead.

* * * * *